United States Patent [19]

Shiomura et al.

[11] 4,184,036

[45] Jan. 15, 1980

[54] METHOD FOR RECOVERING ATACTIC POLYPROPYLENE

[75] Inventors: Tetsunosuke Shiomura, Takaishi; Tatuo Ooka, Izumi; Takashi Kobayashi, Takaishi; Kazuo Hagiwara, Izumi; Hideo Sadotomo, Tokyo, all of Japan

[73] Assignee: Mitsui Toatsu Chemicals, Incorporated, Tokyo, Japan

[21] Appl. No.: 914,510

[22] Filed: Jun. 12, 1978

[51] Int. Cl.$^2$ .............................................. C08F 6/12
[52] U.S. Cl. ................................... 528/499; 526/351; 528/501
[58] Field of Search ............................... 528/501, 499

[56] References Cited

U.S. PATENT DOCUMENTS 3,285,899  11/1966  Houser et al. ........................ 528/501
3,936,512  2/1976   Tabara et al. ........................ 528/501
3,993,713  11/1976  Van Bredepode et al. ......... 528/501

FOREIGN PATENT DOCUMENTS 898838  6/1962  United Kingdom .
1040669 9/1966  United Kingdom .

Primary Examiner—Stanford M. Levin

[57] ABSTRACT

A solution containing atactic polypropylene by-produced during the preparation of a propylene-containing polymer is passed through a tubular, elongated heating zone having a pressure difference of at least 3 kg/cm$^2$ between its inlet and outlet so that the calculated flow velocity at the outlet is at least 40 m/sec, whereby sticky fine particles of molten atactic polypropylene substantially free of the solvent are formed in suspension in the vaporized solvent. Then, the sticky fine particles are separated from the vaporized solvent.

14 Claims, No Drawings

METHOD FOR RECOVERING ATACTIC POLYPROPYLENE

BACKGROUND OF THE INVENTION

This invention relates to an improved method for recovering atactic polypropylene by-produced during the preparation of propylene homopolymer or a copolymer of propylene and one or more other α-olefins (both of which will hereinafter be referred to generically as "propylene-containing polymer").

In the course of the preparation of a propylene-containing polymer, atactic polypropylene is by-produced in a concentration of from 1 to 15% by weight based on that fraction of polypropylene which is useful as the desired product. Since the propylene-containing polymer product is insoluble in the polymerization solvent and non-polymerized α-olefin(s) used as the starting material, it remains suspended in the polymerization solvent and/or non-polymerized α-olefin at the end of the polymerization reaction. On the other hand, atactic polypropylene is soluble in the polymerization solvent or in the non-polymerized α-olefin at the end of the polymerization reaction, and therefore, the greater part of the atactic polypropylene formed is dissolved in the polymerization solvent and/or non-polymerized α-olefin, and the rest is mixed in the propylene-containing polymer product. However, the quality of the propylene-containing polymer product will be impaired if atactic polypropylene is contained therein beyond a certain limit. It is a common practice, therefore, to remove any atactic polypropylene from the propylene-containing polymer product by extraction with the α-olefin starting material, the polymerization solvent or an extractant.

Such atactic polypropylene may be used as a molding material (for the manufacture of carpet backings and the like), thickening agent, and solid fuel, or may be thermally decomposed to produce fuel oil. It is desirable in all of these applications that the residual volatiles content of atactic polypropylene be not greater than 5% by weight.

As stated above, atactic polypropylene is obtained as a homogeneous solution in a variety of solvents. For the above-described uses, therefore, it is necessary to recover solid atactic polypropylene by vaporizing the solvent. The method of recovery which has been commonly used in the prior art is based on the fact that atactic polypropylene goes through a sticky molten form during the recovery process. Specifically, an atactic polypropylene solution is preheated and fed to a thin film evaporator having a rotating shaft provided with scraper blades, where the solvent is vaporized while the atactic polypropylene is recovered by scraping sticky atactic polypropylene built up on the vessel wall. However, a thin film evaporator tends to develop troubles because of the mechanical complexity of its construction, besides being expensive.

Furthermore, as the vaporization of the solvent proceeds, the viscosity of the solution increases and the solvent becomes progressively more difficult to vaporize. Since a highly viscous melt is produced upon completion of the vaporization, resort must be made to mechanical drive means such as scraper blades or extruder screws, or else the melt will build up on the vessel wall and eventually clog the evaporation apparatus.

SUMMARY OF THE INVENTION

It is an object of this invention to provide an improved method for recovering atactic polypropylene easily from a homogeneous atactic polypropylene solution.

It is another object of this invention to provide an improved method for recovering atactic polypropylene from an atactic polypropylene solution without clogging the evaporation apparatus, and without resorting to mechanical drive means.

These and other objects, features and advantages of this invention will become apparent from the following brief description of the improvement contributed to the art.

In the method for recovering atactic polypropylene from a solution containing the same and by-produced during the preparation of propylene-containing polymer, the solvent contained in said solution is vaporized to yield molten atactic polypropylene. The improvement provided to this method by the present invention comprises passing said solution through a tubular, elongated heating zone having a pressure difference of at least 3 kg/cm$^2$ between inlet and outlet thereof so that the calculated flow velocity of the outgoing stream at said outlet is at least 40 m/sec, whereby sticky fine particles of molten atactic polypropylene substantially free of said solvent are produced in the form of a solid-in-gas suspension in said vaporized solvent, and then separating said tacky fine particles from said vaporized solvent in a separation zone. The pressure at the inlet of the heating zone is greater than the pressure at the outlet.

DETAILED DESCRIPTION OF THE INVENTION

In the method of the invention wherein a homogeneous atactic polypropylene solution to be treated is passed through a tubular, elongated heating zone, such as that of a conventional double-walled tube, to vaporize the solvent contained in the homogeneous solution, (a) the difference in pressure between the inlet and outlet of the heating zone is adjusted to be at least 3 kg/cm$^2$ and (b) the calculated flow velocity of the outgoing stream (assuming that the solvent has been completely vaporized) at the outlet of the heating zone is determined to be at least 40 m/sec. By the action of the vaporized solvent, the atactic polypropylene is turned into molten fine particles suspended in the vaporized solvent and discharged from the heating zone without sticking to the tube wall.

The solvent containing atactic polypropylene by-produced during the preparation of a propylene-containing polymer has for its solvent a mixture of a diluent for the propylene polymerization catalyst and at least one member selected from the group consisting of:

(a) non-polymerized propylene and one or more other non-polymerized α-olefin (in case of the copolymerization of propylene and one or more other α-olefins) as starting materials, (b) a mixture of a polymerization solvent and a polymerization catalyst decomposer, and (c) an atactic polypropylene extractant such as hydrocarbon and/or alcohols having more than three carbon atoms (inclusive).

The composition of the aforesaid solvent may vary according to the type of process employed in the preparation of the propylene-containing solvent. With bulk polymerization process, for example, atactic polypropylene is dissolved in the non-polymerized portion of liquid propylene starting material or in a mixture of non-polymerized propylene and the non-polymerized portion of one or more other liquid α-olefin starting materials. Where the so-called solvent replacement process is employed, liquid propylene or a mixture of liquid propylene and one or more other α-olefins is allowed to polymerize or copolymerize, and non-polymerized propylene or a mixture of non-polymerized propylene and one or more other non-polymerized α-olefins is removed. Then, the propylene-containing polymer is re-suspended in an extractant, so that atactic polypropylene is dissolved in this extractant. Useful extractants include hydrocarbons having a normal boiling point higher than room temperature, such as hexane and heptane, alcohols such as isopropanol and isobutanol, and the like, Furthermore, where the solution polymerization process is employed, the polymerization is carried out in the presence of a hydrocarbon such as hexane, cyclohexane or heptane. Thus, atactic polypropylene is present in the form of a homogeneous solution in the aforesaid polymerization solvent.

With any of the above-described processes, a polymerization catalyst diluent such as pentane, heptane, cyclohexane, petroleum ether, kerosene, decalin, benzene, toluene or xylene coexists in the atactic polypropylene solution. In case of the solution polymerization process, a polymerization catalyst decomposer such as acetylacetone, isopropanol or isobutanol as well as propylene oxide also coexists in the atactic polypropylene solution.

Atactic polypropylene is formed not only during the homopolymerization of propylene, but also during the copolymerization of propylene and one or more other α-olefins having from 2 to 8 carbon atoms. The properties of such atactic polypropylene may vary widely depending on the type of α-olefin starting material(s), the type of polymerization catalyst, the type of polymerization solvent, and other polymerization conditions. Its intrinsic viscosity can range from 0.1 to 2.0 dl/g as measured in tetralin at 135° C. Especially in cases of copolymerization, the solution to be treated will have high viscosity and molten atactic polypropylene will be highly sticky.

The atactic polypropylene solution is continuously, or intermittently at proper intervals, feeding into a heating zone. This heating zone is required to have a pressure difference of at least 3 kg/cm$^2$ and preferably from 3 to 50 kg/cm$^2$ between the higher inlet pressure and the lower outlet pressure thereof. Under the action of this pressure difference, the solution fed to the inlet of the heating zone flows toward the outlet at high velocity, during which the solvent contained in the solution is vaporized. If the solution consists exclusively of atactic polypropylene and a low-boiling solvent (such as propane, propylene or butane) which is gaseous at normal temperatures and pressures, it is unnecessary to preheat the solution prior to introduction into the heating zone. If the solution contains a solvent having a higher boiling point, for example, above 10° C., it is desirable to pre-heat the solution to a temperature higher than the boiling point of the solvent before feeding it to the heating zone. Preferably, the pressure at the inlet of the heating zone is from 3.1 to 50 kg/cm$^2$ G.

The heating zone is preferably composed of an elongated tube, which is provided with a heating jacket on the outside. To the heating zone there is supplied sufficient heat to completely vaporize the solvent contained in the solution. If steam is used as the heat source, it is desirable that its temperature be 120° C. or above. The preferred temperature of the heating steam is between 140° C. and 300° C. Any other vaporous heating medium may be used as the heat source. It is undesirable, however, to use a liquid heating medium as the heat source, because an unduly long tube is required due to its low film coefficient of heat transfer. Those skilled in the art will be able to determine correctly the diameter and length of the heating zone according to the production capacity of the equipment. Generally, the ratio of diameter to length is preferably in the range of from 1:500 to 1:5,000. By way of example, the heating zone can have a diameter of from 0.95 cm (⅜") to 7.6 cm (3") and a length of from 20 to 150 meters.

The flow velocity of the solution at the inlet of the heating zone should be at least 5 m/sec. and preferably from 5 to 25 m/sec, and the flow velocity of the outgoing stream at the outlet should be at least 30 m/sec and preferably from 40 to 160 m/sec. By the shearing action of the turbulent flow of solvent vaporized from the atactic polypropylene solution and flow at high velocity, the atactic polypropylene separated from the solvent is divided into fine particles and then dispersed and suspended in the solvent vapor.

The temperature of the solution at the inlet of the heating zone should be higher than the boiling point of the solution under the pressure of the heating zone at its inlet. The temperature of the stream at the outlet of the heating zone should be higher than the melting point (about 150° C.) of the atactic polypropylene.

The outgoing stream of solvent vapor having molten fine particles of atactic polypropylene suspended therein is then introduced into a separation zone, where the molten fine particles of atactic polypropylene are separated from the solvent vapor. The separation zone is usually composed of a cyclone or an inertial dust collector, for example, of the impinging type or the deflection-flow. Preferably, the pressure in the separation zone is substantially the same as the pressure of the heating zone at its outlet, i.e. from 0.1 to 0.8 kg/cm$^2$ G. The temperature in the separation zone should be higher than the melting point of the atactic polypropylene under the pressure of the separation zone. The solvent vapor is removed from the top of the separation zone and transferred to a solvent recovery zone, while the atactic polypropylene in the molten state is withdrawn from the bottom. In order to ensure smooth removal, the separation zone is desirably kept heated as stated above.

Since the melting point and melt viscosity of atactic polypropylene may vary according to the type of propylene-containing polymer being prepared, it is desirable to regulate properly the amount of heat supplied in the heating zone to the solution to be treated. Under such circumstances, the flow rate of the atactic polypropylene solution should be controlled so that atactic polypropylene having a constant level of dryness may be obtained without modifying the size of the apparatus. This can be achieved by installing a flow control device composed of a ball valve at the inlet of the heating zone. This flow control device (preferably a ball valve) is particularly advantageous because its operating characteristics are satisfactory at low flow rates, it is free from such troubles as blockage of the valve due to the presence of a small amount of propylene-containing polymer particles in the atactic polypropylene solution, and its shut-off characteristics are good enough to exclude the atactic polypropylene solution completely from the heating zone when required.

In the practice of this invention, the flow velocity of the stream leaving the heating zone may be reduced to from 1/10 to ½ of its original value. This can be achieved by installing a diffuser between the outlet of the heating zone and the separation zone and injecting a small amount of liquid water thereinto so that its sensible heat and latent heat may be utilized to cool the outgoing stream. Consequently, the separation zone can be simplified in construction and reduced in size. That is, a separator of simple construction, such as single cyclone dust collector or baffle type dust collector, may be employed. The amount of water injected into the diffuser should be such that the temperature of the separation zone is prevented from falling below the melting point of the atactic polypropylene. Moreover, the vessel wall and baffle plates of the dust collector are desirably heated to a temperature higher than the melting point of the atactic polypropylene so as to ensure its smooth withdrawal.

Furthermore, in the practice of this invention, the heating zone may comprise a first section composed of an elongated tube of relatively small diameter and a second section composed of an elongated tube of relatively large diameter and connected in series with the first section. This arrangement enables one to regulate the flow velocity of the outgoing stream at the outlet of the second section to some extent. In addition, where the solution is continuously fed, the flow rate of the solution can be controlled by regulating the amount of heat supplied to the first section. It is to be understood that, where this arrangement is employed, a flow control device composed of a ball valve and/or a diffuser may also be installed when required. Preferably, the ratio of the diameter of the first section to that of the second section is in the range of from 1:1.2 to 1:3, in order to ensure the flow control range from 100% to 50%.

In accordance with the teachings of this invention, the solvent can be easily evaporated from an atactic polypropylene solution by a simplified method. Moreover, although no resort is made to mechanical drive means such as scraper blades and extruder screws, atactic polypropylene does not attach to or build up on the inner surfaces of the eveporation apparatus and, therefore, does not cause any blockage of the evaporation apparatus. Furthermore, the atactic polypropylene thus obtained has a residual volatile content equivalent to that of the atactic polypropylene obtained with a conventional thin film evaporator and is equally useful for practical applications.

The following examples are given merely to aid in the understanding of the invention, and variations may be made by those skilled in the art without departing from the spirit and scope of the invention.

EXAMPLE 1

A heptane solution containing 4.5% by weight of atactic polypropylene formed as a by-product during the polymerization of propylene was preheated to 190° C. in an intermediate vessel kept at a pressure of 7 kg/cm² G and continuously fed therefrom to the inlet of a heating zone. The pressure at the inlet of the heating zone was substantially equal to the pressure in the intermediate vessel.

The heating zone was composed of a double-walled tube having an internal diameter of 0.016 m and a length of 50 m, and heated by supplying the space between its inner and outer walls with steam having a temperature of 250° C. To the outlet (kept at 0.5 kg/cm² G) of the heating zone was connected a cyclone kept at essentially atmospheric pressure, into which the stream going out of the heating zone was allowed to spout. Heptane vapor was drawn out from the top of the cyclone, while atactic polyproylene was withdrawn from the bottom.

When the outlet valve of the intermediate tank was fully opened, the aforesaid heptane solution was discharged at a flow rate of 330 kg/hr. The operation could be smoothly carried on for a period of 72 hours without such troubles as blockage of the heating zone.

Under these conditions, the calculated flow velocity of the outgoing stream at the outlet of the heating zone was about 86 m/sec.

The atactic polypropylene thus obtained had a volatiles (heptane) content of 2.5% by weight, which seemed to be satisfactory from a practical point of view. Its intrinsic viscosity was 0.32 dl/g.

EXAMPLE 2

A propylene solution containing 8% by weight of atactic polypropylene formed as a by-product during the bulk polymerization of propylene was provided in an intermediate vessel kept at a temperature of 60° C. and a pressure of 25 kg/cm² G and continuously fed therefrom to the inlet of a heating zone. The heating zone was composed of the same double-walled tube as used in Example 1, and the pressures at its inlet and outlet were 25 kg/cm² G and 0.5 kg/cm² G, respectively.

When the flow rate of the atactic polypropylene solution was 1,100 kg/hr, the operation could be smoothly carried on by supplying the space between the inner and outer walls of the tube with steam having a temperature of 164° C. Similarly, when the flow rate of the atactic polypropylene solution was 680 kg/hr, the operation could be smoothly carried on by supplying the aforesaid space with steam having a temperature of 200° C. Under these conditions, the calculated flow velocity of the outgoing stream was 103 m/sec. and 66 m/sec, respectively.

In both cases, the atactic polypropylene thus obtained had a volatile content of 1.5% by weight. Its intrinsic viscosity was 0.20 dl/g.

EXAMPLE 3

The same equipment as shown in Example 1 was used. Heptane solution containing 4.5% by weight of atactic polypropylene was heated to 150° C. and the pressure of the intermediate vessel was kept at 4 kg/cm² G by adding nitrogen continuously. The solution was introduced into the evaporation zone, the outlet of which was kept at 0.5 kg/cm² G. Under these conditions, the flow rate was maintained at the constant value of 160 kg/hr without any indications of clogging

CONTROL

The same equipment as shown in example 1 was used. Heptane solution containing 4.5% by weight of atactic polypropylene was heated to 150° C. and the pressure of the intermediate vessel was kept at 3 kg/cm² G. The solution was introduced into the evaporation zone, the outlet of which was kept at 0.5 kg/cm² G. The calculated flow velocity at the outlet was 30 m/sec.

After several minutes, the flow rate of the solution was observed to gradually decrease, until the solution ceased to flow at all by the result of the clogging of the viscous atactic polymer sticking inside the tube.

We claim:

1. In a method for recovering atactic polypropylene from a solution containing the same and by-produced during the preparation of a propylene-containing polymer selected from the group consisting of propylene homopolymer and a copolymer of propylene and at least one other α-olefin by vaporizing the solvent contained in said solution to yield molten atactic polypropylene, the improvement comprising: passing said solution through a tubular, elongated heating zone having a higher pressure inlet and a lower pressure outlet; the temperature of the said solution at the outlet of said heating zone being higher than the melting point of said atactic polypropylene: maintaining a pressure difference of from 3 kg/cm$^2$ to 50 kg/cm$^2$ between said inlet and outlet so that the calculated flow velocity of said solution at said outlet is at least 40 m/sec., whereby molten fine particles or atactic polypropylene substantially free of said solvent are formed in suspension in the vaporized solvent; and then separating said fine particles from said solvent in a separation zone.

2. The method as claimed in claim 1 wherein said solvent is a mixture of a polymerization catalyst diluent and at least one member selected from the group consisting of
   (a) non-polymerized propylene, a mixture of non-polymerized propylene and at least one other non-polymerized α-olefin,
   (b) a mixture of a polymerization solvent and a polymerization catalyst decomposer, and
   (c) an atactic polypropylene extractant.

3. The method as claimed in claim 2 wherein said polymerization catalyst diluent is at least one member selected from the group consisting of pentane, heptane, petroleum ether, kerosene, decalin, cyclohexane, benzene, toluene and xylene.

4. The method as claimed in claim 2 wherein said polymerization solvent is a member selected from the group consisting of hexane, heptane, and cyclohexane.

5. The method as claimed in claim 2 wherein said polymerization catalyst decomposer is a member selected from the group consisting of propylene oxide, acetylacetone, isopropanol, and isobutanol.

6. The method as claimed in claim 2 wherein said atactic polypropylene extractant is a member selected from the group consisting of hexane, heptane, isopropanol, and isobutanol.

7. The method as claimed in claim 1 wherein said flow velocity is from 40 to 160 m/sec.

8. The method as claimed in claim 1 wherein said solution is intermittently fed into said heating zone.

9. The method as claimed in claim 1 wherein said solution is continuously fed into said heating zone.

10. The method as claimed in claim 1 wherein the flow velocity of said solution at said outlet is reduced to from 1/10 to ½ of the original inlet value by passing said solution through a reducer and injecting water therein.

11. The method as claimed in claim 1 wherein said heating zone is heated with steam having a temperature of 120° C. to 300° C.

12. The method as claimed in claim 1 wherein the temperature of said solution at said inlet is higher than the boiling point of said solution at the pressure at said inlet.

13. The method as claimed in claim 1 wherein the pressure at said inlet of said heating zone is from 3.1 to 50 kg/cm$^2$ G.

14. The method as claimed in claim 1 wherein the temperature of said separation zone is higher than the melting point of said atactic polypropylene.

* * * * *